United States Patent
Duhain et al.

(10) Patent No.: US 11,873,570 B2
(45) Date of Patent: Jan. 16, 2024

(54) METAL-CNT COMPOSITE, PRODUCTION METHOD AND MATERIALS THEREFOR

(71) Applicant: LUXEMBOURG INSTITUTE OF SCIENCE AND TECHNOLOGY (LIST), Esch sur Alzette (LU)

(72) Inventors: Antoine Duhain, Esch sur Alzette (LU); Marc Michel, Esch sur Alzette (LU); Guillaume Lamblin, Leignon (BE); Damien Lenoble, Wellin (BE)

(73) Assignee: LUXEMBOURG INSTITUTE OF SCIENCE AND TECHNOLOGY (LIST), Esch sur Alzette (LU)

( * ) Notice: Subject to any disclaimer, the term of this patent is extended or adjusted under 35 U.S.C. 154(b) by 248 days.

(21) Appl. No.: 17/259,211

(22) PCT Filed: Aug. 22, 2019

(86) PCT No.: PCT/EP2019/072454
§ 371 (c)(1),
(2) Date: Jan. 11, 2021

(87) PCT Pub. No.: WO2020/043590
PCT Pub. Date: Mar. 5, 2020

(65) Prior Publication Data
US 2022/0363542 A1    Nov. 17, 2022

(30) Foreign Application Priority Data
Aug. 27, 2018   (LU) ........................................ 100919

(51) Int. Cl.
C25D 5/56       (2006.01)
C01B 32/168    (2017.01)
(Continued)

(52) U.S. Cl.
CPC .............. C25D 5/56 (2013.01); C01B 32/168 (2017.08); C23C 18/1662 (2013.01); B82Y 30/00 (2013.01); B82Y 40/00 (2013.01)

(58) Field of Classification Search
CPC ........ C25D 5/56; C25D 15/00; C01B 32/168; C01B 32/158; C01B 32/159; C01B 32/16;
(Continued)

(56) References Cited

U.S. PATENT DOCUMENTS

2007/0036978 A1*  2/2007  Chen ....................... C22C 26/00
                                                               257/E21.585
2010/0038251 A1   2/2010  Kim
2016/0046815 A1*  2/2016  Messersmith ....... C23C 18/2066
                                                               427/407.1

FOREIGN PATENT DOCUMENTS

CN   107093748 A   8/2017
CN   107252695 A   10/2017
CN   107604419 A   1/2018

OTHER PUBLICATIONS

Wang, et al., Selective sensing of hydroquinone and catechol based on multiwalled carbon nanotubes/polydopamine/gold nanoparticles composites, Sensors and Actuators B 2016; 223: 501-508 (Year: 2016).*

(Continued)

Primary Examiner — Daniel C. McCracken
(74) Attorney, Agent, or Firm — CANTOR COLBURN LLP

(57) ABSTRACT

According to a first aspect of the invention, a method for producing a metal-CNT composite material is proposed. The method includes providing a layer of CNT by depositing CNT coated with a polyphenol or poly(catecholamine) coating and filling the interstices of the carbon nanotubes layer with a metal so as to form a metal matrix, in which CNT are embedded. The filling is effected by electrode position or by (Continued)

electroless deposition. The polyphenol or poly(catecholamine) coating is crosslinked by metal ions, the metal ions promoting, as metal seeds, adhesion and/or growth of the metal matrix during the filling step. A further aspect of the invention relates to the metal-CNT composite obtainable by the method.

29 Claims, 9 Drawing Sheets

(51) Int. Cl.
*C23C 18/16* (2006.01)
*B82Y 30/00* (2011.01)
*B82Y 40/00* (2011.01)

(58) Field of Classification Search
CPC ... C01B 32/162; C01B 32/164; C01B 32/166; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; C23C 18/1662; B82Y 30/00; B82Y 40/00; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

OTHER PUBLICATIONS

Aqel, et al., Carbon nanotubes, science and technology part (I) structure, synthesis and characterization, Arabian Journal of Chemistry 2012; 5: 1-23 (Year: 2012).*
Jiang, et al., Preparation and characterization of silver nanoparticles immobilized on multi-walled carbon nanotubes by poly(dopamine) functionalization, J. Nanopart. Res. 2012; 14: 938, pp. 1-10 (Year: 2012).*
Materials & Processes: Resin matrices for composites, accessed online at https://www.compositesworld.com/articles/the-matrix (Mar. 25, 2016). (Year: 2016).*
Schindler, et al., Solution-deposited carbon nanotube layers for flexible display applications, Physica E 2007; 37: 119-123 (Year: 2007).*
Reibold, et al., Carbon nanotubes in an ancient Damascus sabre, Nature 2006; 444: 286 (Year: 2006).*
Han Xu, "Spraying layer-by-layer assembly film based on the coordination bond of bioinspired polydopamine-FeII!" Thin Solid Films, vol. 600, Feb. 1, 2016, pp. 76-82, XP55636087.
International Search Report for corresponding application PCT/EP2019/072454 filed Aug. 22, 2019; dated Nov. 4, 2019.
Written Opinion of the International Searching Authority for corresponding application PCT/EP2019/072454 filed Aug. 22, 2019; dated Nov. 4, 2019.

* cited by examiner

METAL-CNT COMPOSITE, PRODUCTION METHOD AND MATERIALS THEREFOR

FIELD OF THE INVENTION

The invention generally relates to metal-carbon nanotube composites, methods for producing such composites and materials (e.g. intermediate products) useful in the production methods.

BACKGROUND OF THE INVENTION

Due to the ongoing trend to miniaturization in microelectronics, more and more conductors operate close to their maximum current-carrying capacity. The maximum current density that a material can withstand without damage on its functional properties is referred to hereinafter as "ampacity". Operating conductors close to their ampacity limit leads to decreased lifetime of electronic devices. As a consequence, increased research efforts are made to develop materials with similar electrical conductivities as copper, silver or gold but having higher ampacity. Such materials could also be used in various domains, like lightning strike protection (e.g. in airplanes), in microelectronics, power electronics and so on.

Metal-carbon nanotube composites have been devised as particularly promising materials in the above respect. Carbon nanotubes (CNT) have received a lot of interest since the publications of S. Iijima in the 1990s (e.g. Iijima S., "Helical microtubules of graphite carbon," Nature 1991; 354: 56-8 and Iijima S, Ichihashi T., "Single-shell carbon nanotubes of 1-nm diameter," Nature 1993; 363: 603-5). A lot of scientific work is ongoing regarding integration of CNT into a copper matrix in order to improve its thermal and electrical properties. An overview of the most common manufacturing routes, i.e., based on powder metallurgy, electroplating or electroless deposition, may be found in Janas D., Liszka B., "Copper matrix nanocomposites based on carbon nanotubes or graphene," Mater. Chem. Front., 2018, 2, 22-35. As indicated in that publication, a difficulty that one encounters in the above methods resides in the inherent "cuprophobic" nature of the CNT. As regards the electroplating technique, it is particularly difficult to achieve a good filling of the interstices between the CNT with copper due to the high hydrophobicity of the CNT.

It is an objective of aspects of the present invention to facilitate manufacturing of metal-CNT composites. Specific aspects of the invention relate to the fabrication of Cu-CNT composites but other metals may be used as well.

SUMMARY OF THE INVENTION

According to a first aspect of the invention, a method for producing a metal-CNT composite material is proposed. The method includes:
- providing a layer of CNT by depositing, on a substrate, CNT coated with a polyphenol or poly(catecholamine) coating;
- filling the interstices of the carbon nanotubes layer with a metal so as to form a metal matrix, in which CNT are embedded. The filling is effected by electrodeposition or by electroless deposition.

It will be appreciated that the method according to the first aspect uses polyphenol- or poly(catecholamine)-coated CNT rather than "naked" CNT. Particularly preferred CNT coatings include polydopamine ("pda"), tannic acid and polycatechol. These coatings may form metal-organic complexes by chelation and/or by crosslinking with metal ions. Tests showed that these coatings help to improve the homogeneity of the CNT suspension and thus to improve homogeneity of the CNT concentration throughout the metal matrix as well as the bond strength between the CNT and the metal matrix. The CNT themselves could be single-walled CNT (SWCNT), multi-walled CNT (MWCNT) or mixtures thereof.

Preferably, the layer of CNT forms a tangle. As used herein, the term "tangle" designates a three-dimensional cluster or accumulation of CNT having generally disordered appearance. Preferably, the CNT are randomly oriented, such that the CNT tangle resembles a thicket rather than a so-called CNT "forest" wherein the CNT are generally aligned in parallel. It should be noted that perfect randomness of the orientations of the CNT within the tangle (implying isotropy) is not a requirement but may be advantageous for specific applications.

The coated carbon nanotubes may be provided within a suspension and depositing the carbon nanotubes may include spraying the suspension on a substrate and causing the dispersion medium to evaporate. The spraying (and evaporation) may be repeated until a desired thickness of the CNT layer is reached. It may be worthwhile noting that thanks to the invention, metal-CNT composites with increased thickness could be obtained, while maintaining a satisfactory degree of filling of the interstices. The thickness of the CNT layer and thus of the metal-CNT composites could, e.g., be greater than 10 µm, or greater than 20 µm, or greater than 50 µm. Preferred thickness ranges of the CNT layer and thus of the metal-CNT composites are from 50 nm to 100 µm and from 50 nm to 50 µm.

The polyphenol or poly(catecholamine) coatings of the carbon nanotubes comprise metal seeds for promoting adhesion and/or growth of the metal matrix during the filling step(s). The metal seeds comprise metal ions crosslinking polyphenol or poly(catecholamine). Optionally, there may also be metal ions that are chelated by polyphenol or poly(catecholamine). The metal seeds may be of the same species as the metal matrix. Alternatively, the metal seeds could be of a different species than the metal matrix. The presence of the metal seeds leads to a more homogeneous filling of the CNT layer with metal and improves the interface between the metal phase and the CNT. This is expected to improve the thermal and electrical conductivities of the composite material.

The metal matrix may comprise any metal species or combination of metal species. Particularly preferred for forming the metal matrix are the following metals: Cu, Ag, Au, Sn, Zn, Cd, Cr, Ni, Pt, Pb, Pd, Co, Ti, Fe, and alloys thereof.

The filling of the interstices of the CNT layer is effected from an aqueous solution comprising metal ions, in particular, by electrodeposition (also: electroplating) or by electroless deposition.

Deposition of the metal matrix may be carried out while the CNT layer remains attached to the substrate. In the case of electrodeposition, the substrate typically forms the working electrode and becomes part of the composite material. Electroless deposition may also be carried out while the CNT layer remains attached to a substrate. Alternatively, however, the CNT layer could be removed from the substrate on which it has been deposited prior to or during electroless deposition.

The deposition of the metal matrix could be stopped when the filling of the interstices is complete. If a more porous composite is desired, the deposition could also be stopped before that moment. The deposition could also be continued when the filling of the interstices is complete, in such a way that a metal capping layer (essentially free of CNT) is formed on the composite material.

The composite material could be annealed after the filling step has been terminated. The annealing could lead to destruction of the polyphenol or poly(catecholamine) coating and result in the formation of a graphitic and/or amorphous carbon layer at the interface between the CNT and the metal matrix. Annealing may be advisable, in particular, for applications in which the composite material is likely to heat up to relatively high temperatures. Annealed metal-CNT composites could also exhibit improved thermal and/or electrical properties.

The method may use polyphenol- or poly(catecholamine)-coated CNT as a base product. Alternatively, the coating of the CNT may be part of the method. In this case, coating is preferably carried out in a solution containing phenol and/or catecholamine moieties wherein initially uncoated carbon nanotubes are dispersed. Such a solution would also contain a certain amount of metal ions capable of crosslinking the phenol and/or catecholamine moieties. The coating of the CNT may be carried out under sonication, e.g. under ultra-sonication, and/or under stirring. The solution may further comprise one or more catalysts, buffering agents, etc. The carbon nanotubes are preferably oxidized prior to dispersion in the solution containing phenol and/or catecholamine moieties.

The composite material may be produced so as to form one or more electrical conductors on a substrate by using a patterning technique. Any patterning technique compatible with the deposition process could be used, for example, the techniques described in WO 02/103085 A1, WO 2007/058603 A1, as well as later techniques relying on these.

A second aspect of the invention relates to a composite conductive material obtainable by the method described above. The material is a metal-CNT composite and comprises:
- a layer of CNT that are coated with a polyphenol or poly(catecholamine) coating, and
- a metal matrix filling the interstices of the carbon nanotubes layer.

The polyphenol or poly(catecholamine) coating also comprises metal ions crosslinking the polyphenol or poly(catecholamine) coating. Optionally, there may also be metal ions chelated by polyphenol or poly(catecholamine).

As indicated above, the polyphenol or poly(catecholamine) coating could be destroyed in an annealing step. Accordingly, according to a third aspect of the invention, the CNT comprise a graphitized or amorphous carbon coating at the interfaces with the metal matrix.

The CNT are preferably oriented in a generally random manner.

Conductive materials according to various aspects of the invention could be used in electrical conductors (e.g. for lightning protection, such as lightning arrestors, etc., or for power circuitry), Faraday cages, etc.

Yet a further aspect of the invention relates to carbon nanotubes coated with a polyphenol or poly(catecholamine) coating, wherein metal ions crosslink and/or are chelated by polyphenol or poly(catecholamine). It will be appreciated that such coated CNT could be manufactured separately from the composite metal-CNT material. Furthermore, such CNT could be used in different applications. The coated CNT could be conditioned and packaged as a dry powder or, alternatively as a suspension or dispersion in a compatible dispersion medium. As a further possibility, the coated CNT could be provided in the form of a CNT tissue (packaged in dry form or in a liquid medium).

BRIEF DESCRIPTION OF THE DRAWINGS

By way of example, preferred, non-limiting embodiments of the invention will now be described in detail with reference to the accompanying figures, in which.

DETAILED DESCRIPTION OF EMBODIMENTS AND EXAMPLES

Figure 1:
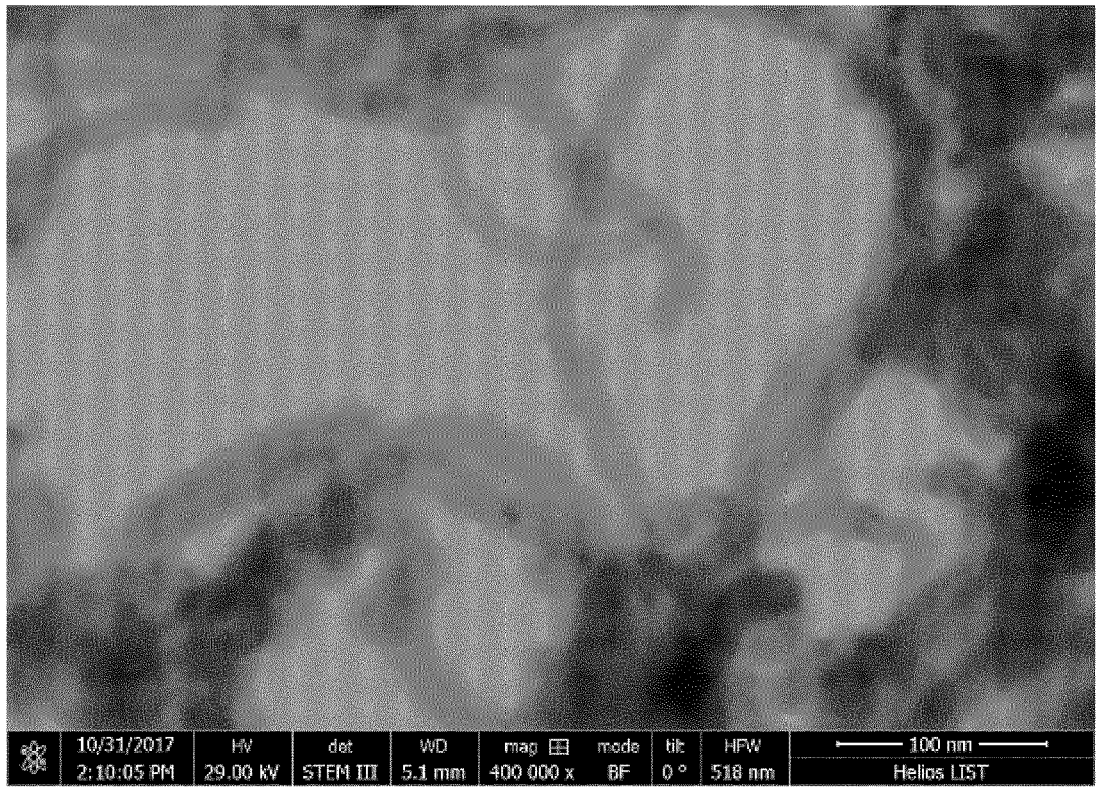
FIG. 1: is a STEM image of pda-coated CNT obtained by a $1^{st}$ coating protocol.

The invention will hereinafter be discussed mostly on the basis of example embodiments involving copper-CNT (Cu- CNT) composites. Such Cu-CNT composites exhibit improved performance in terms of ampacity which could be used in various domains, such as, for example, lightning strike protection in airplanes, microelectronics and so on. It should be noted, however, that copper is only one among several metals that are considered for forming metal-CNT composites in the context of the present invention.

In aircraft design, materials and their geometries have to be chosen in order to reduce aircraft weight while keeping an acceptable lightning strike protection capacity.

For this, the following material properties should be maximized in electrical conductors used for that purpose:
  electrical conductivity, to allow the material to effectively conduct the current on the desired paths, and
  ampacity, to allow the material to resist to high current densities and to reduce the amount of material needed (reduced weight).

The ampacity can be defined as the current density as from which the resistivity of the material starts to exponentially increase. Its value depends mainly on two phenomena, which are Joule heating and electromigration. Electromigration failure may occur in high current regime, when atoms begin to migrate by interaction with the electron flow and cause crack formation due to material depletion in a point of the conductor.

High ampacity and high electrical conductivity are generally mutually excluded properties. The first needs a strongly bonded system while the second needs a weakly bonded system. One potential way to combine both properties is to use a composite of two materials exhibiting high ampacity and high electrical conductivity respectively. Subramaniam et al., (Nature communications 4 2202 (2013)) used CNT for their high ampacity and copper for its high conductivity and obtained outstanding results (conductivity roughly as in copper but an ampacity about 100 times higher than for copper). Besides demonstrating improved ampacity, Subramaniam et al. showed that their composite also exhibited a lower dependence of electrical conductivity on temperature than copper. The Cu-CNT composite had exhibited thermal conductivity of 395 W $m^{-1}$ $K^{-1}$ (which is close to that of copper: 400 W $m^{-1}$ $K^{-1}$) and a low thermal expansion coefficient (5 ppm $K^{-1}$), similar to that of silicon. The combination of these two properties leads to a value of the thermal distortion parameter (TDP), which characterizes the thermal stability of a material, TDP=CTE/$\kappa$ (where $\kappa$ is the thermal conductivity and CTE the thermal expansion coefficient), comparable to that of silicon, which is the lowest one of all available materials.

As mentioned previously, achieving a satisfactory filling of the interstices between the CNT with copper (or other metals) is a difficult task due to the high hydrophobicity of the CNT. Subramaniam et al. used a two-step approach: a first electroplating step was made using an organic solution of acetonitrile and copper acetate; in a second step, electroplating was carried out with a typical electroplating solution. In detail, an impregnation step of the CNT in acetonitrile-copper acetate solution was carried out for nucleation of Cu seeds, followed by electroplating in the same solution at 5 mA/$cm^2$. The resulting intermediate product was washed with acetonitrile and dried 30 minutes at 60° C. in a vacuum desiccator. Then an annealing step at 250° C. during 3 h in a tube furnace was performed, followed by cooling under $H_2$ at 150 sccm. This was then followed by electroplating in a $CuSO_4$ solution to fill the interstices and the same drying and annealing steps were repeated.

The present invention uses a different approach. A layer of CNT coated with polyphenol or poly(catecholamine) is provided. The interstices of the CNT layer are then filled with the metal matrix, such that the CNT become embedded therein. Examples of polyphenol or poly(catecholamine) are tannic acid and polydopamine, respectively. Polyphenol and poly(catecholamine) are hydrophilic and have redox activity (i.e. are capable of reducing metal ions). Specifically, they are capable of chelating and/or crosslinking with metal ions. Another property that makes these substances interesting in the present context is their ability to coat CNT due to $\pi$-$\pi$ interaction. As an example of these substances, polydopamine will be discussed in more detail. It is worthwhile noting that annealing steps are not required in most embodiments.

Polydopamine (pda) coatings are inspired of the mussel foot which is able to strongly attach on any surface in a wet or dry environment. The protocol of pda formation is relatively simple as it is generally obtained by oxidative polymerization of the dopamine in slightly basic environment (marine pH) using oxygen in the air as oxidant. However, the chemistry of catechols is very versatile and so it is for dopamine. Dopamine is known to be able to polymerize according to three main paths. The first is oxidative polymerization and covalent bonds formation via inverse disproportionation and Michael addition mechanisms leading generally to small oligomers (3-4 units). The second is radical polymerization in presence of a radical initiator. The third is the formation of supramolecular structures via $\pi$-$\pi$ stacking, metal complexation, etc. between pda oligomers. Pda is typically the result of a combination these mechanisms. Each mechanism can be impacted by the pH, the nature of the oxidant, the nature of the buffer, the presence or absence of metal ions, the concentrations, etc., and the same is true for the resulting pda structure.

The catechol/quinone groups of pda strongly interact with metals. They show both strong binding with hydroxylated metal surfaces and high chelating behaviour with metals ions. The interaction with metal surface is believed to enhance the adhesion of sprayed CNT on a metallic surface. The metal chelation ability of pda increases the amount of copper ions on the pda surface in presence of a copper aqueous solution. This aspect improves the content of copper in a CNT-pda layer for further plating and thereby also improves the filling ratio. Since metal ions can act as reversible crosslinkers between the catechols/quinone groups of pda, they can play an important role in pda superstructure formation. It could thus be possible to saturate the pda coating with copper during the polymerization process.

Carrying out polymerization of dopamine in the presence of copper ions modifies the zeta potential of pda. Indeed, pda is unstable in acidic conditions, leading to large aggregates and precipitation. The addition of positively charged copper ions seems able to counter the negative charge of pda and stabilize it at low pH. When pda is used as a coating on the CNT, this aspect is expected to improve the stability of CNT-pda in acidic solution.

Just as the pda coating of the CNT improves the filling with metal in an electroplating process, it also allows (noble) metal (Ag, Pd, . . . ) growth thereon by electroless deposition. Depending of the metal species, it may be possible to carry out electroless deposition without any additional reducing agent, because the pda coating acts as reducing agent and efficient seed layer for further metal grow. However, certain metal species and/or process parameters may require the presence of additional reducing agent in the solution. For instance, the addition of reducing agent in the electrolyte solution may be beneficial for electroless deposition of copper on pda-coated CNT.

CNT coating with pda may be effected in a number of ways. Preferably, one uses a dispersion of oxidized CNT in Tris-HCl (Tris=tris(hydroxymethyl)aminomethane). Dopamine hydrochloride is then added and the dispersion is stirred the time it takes for the dopamine to polymerize and to reach the desired degree of coverage. Depending on the amount of coating on the CNT, the polymerization time may range from 1 minute to 24 hours, preferably from 20 minutes to several hours (e.g. 10 hours or more). If a metal-seeded pda coating is desired, a mixture of dopamine hydrochloride and a metal salt solution may be employed. The solution could be saturated in metal ions but lower concentrations could be used as well.

Oxidization of the CNT may be carried out in nitric acid solution (e.g. in 52 wt. % aqueous $HNO_3$ solution), preferably under sonication. The CNT are then preferably washed with water and filtrated on a suitable membrane (e.g. SartoriusStedim PC membrane with a pore diameter of 0.4 μm). The oxidized CNT can then be dried (e.g. at 80° C.) until all water is evaporated or be directly dispersed in the desired concentration in the coating solution.

CNT Coating

Example 1 ($1^{st}$ Coating Protocol)

5 mg of oxidized CNT (MWCNT, average size: 12 nm×10 μm) are dispersed in 60 ml of Tris-HCl 10 mM in water (pH 8.5). The solution is ultra-sonicated until good dispersion is observed (about 1 minute). Dopamine hydrochloride (DA) is then added to reach a concentration of 0.1 mg/ml and the dispersion is stirred during 24 hours (h) at room temperature.

Example 2 ($2^{nd}$ Coating Protocol)

20 mg of oxidized CNT (MWCNT, average size: 12 nm×10 μm) are dispersed in 50 ml of DA 0.1 mg/ml aqueous solution. The solution is ultra-sonicated. Small volumes of DA solution are then added in combination with ultra-sonication until a volume of 606 ml of DA solution is reached (15 to 30 min). 363.3 ml of Tris-HCl 10 mM is then added to the dispersion. The dispersion is ultra-sonicated to maintain the CNT well dispersed during the first stage of the polymerization. A stable dispersion is obtained after (about) 15 to 45 min. The dispersion is then stirred for 23.5 h. The coated CNT are retrieved by washing with water and filtration on a PC membrane. If the oxidized CNT to be used are dry, a variant of the $2^{nd}$ coating protocol may be used. According to the variant, the dry oxidized CNT are directly dispersed in 606 ml of the DA solution. The rest of the coating process remains the same.

Variants of the above coating protocols may be used to produce CNT coated with pda comprising metal ions crosslinking pda oligomers and/or chelated by pda moieties.

Example 3 ($3^{rd}$ Coating Protocol)

374 mg of $CuSO_4·5 H_2O$ is added to 606 ml of 0.1 mg/ml DA solution (corresponding to a molar ratio $[DA]/[Cu^{2+}] \approx 3/14$): first, 20 mg of oxidized CNT are dispersed in 50 ml of DA $CuSO_4$ solution. Then, as in the $2^{nd}$ protocol, small amounts of the DA $CuSO_4$ solution are progressively added and the dispersion is ultra-sonicated until the volume reaches 606 ml. 363.3 ml of Tris-HCl 10 mM are then added and the dispersion is ultra-sonicated to maintain the CNT well dispersed during the first stage of the polymerization. After 15 to 45 minutes, the dispersion is stirred for 23.5 h (at pH 7). The coated CNT are retrieved by filtration after pH adjustment to 11-12 by addition of NaOH. Adjustment of the pH helps promotes dispersion of pda and thus facilitates evacuation of excess or uncoated pda through the filter. Furthermore, increasing the pH may also improve chelation and/or crosslinking a lead to higher retention of metal in the pda coatings.

Figure 2:
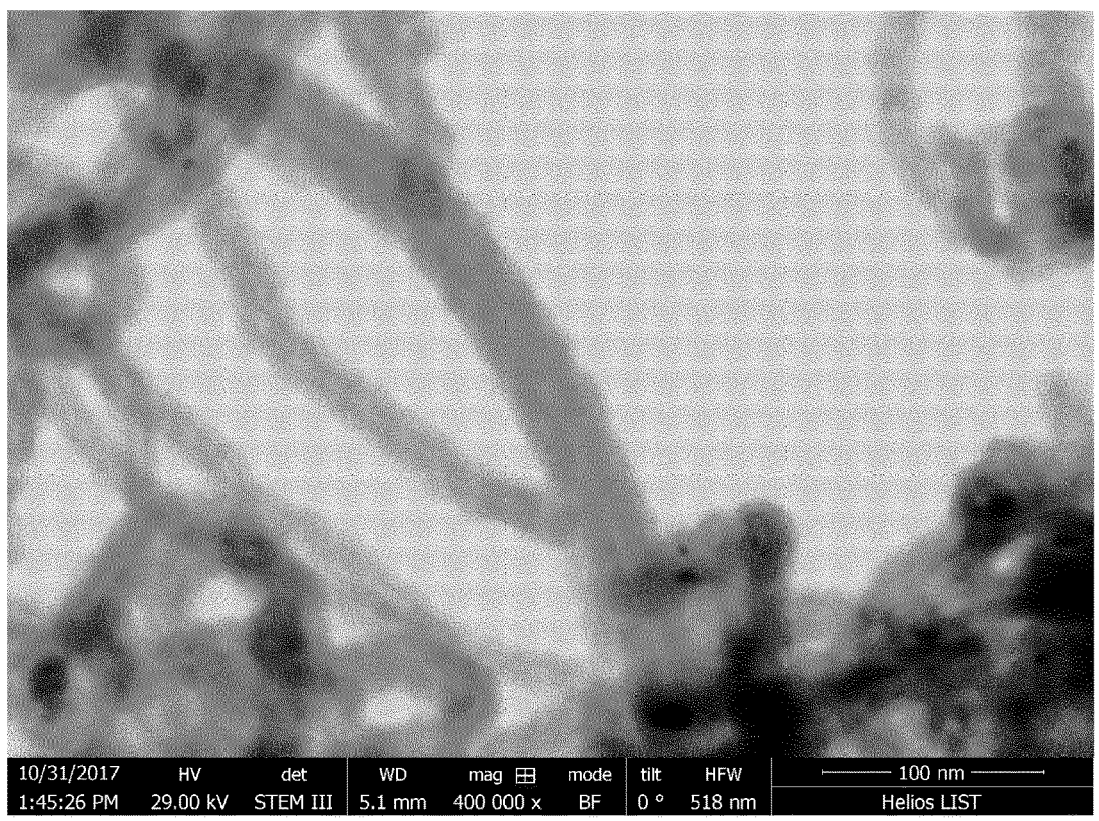
FIG. 2: is a STEM image of pda-coated CNT obtained by a $2^{nd}$ coating protocol.
Figure 3:
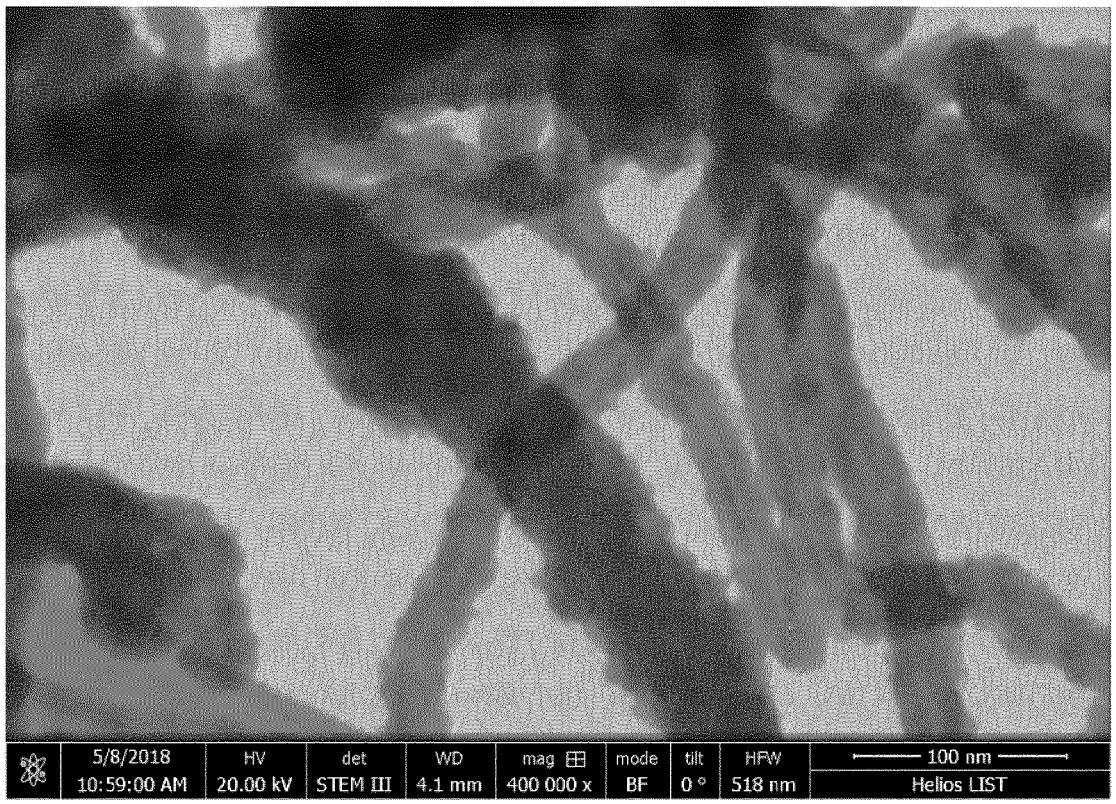
FIG. 3: is a STEM image of metal-seeded pda-coated CNT obtained by a $3^{rd}$ coating protocol.

FIGS. 1, 2 and 3 show STEM (scanning transmission electron microscopy) images of pda-coated CNT obtained by the $1^{st}$, $2^{nd}$ and $3^{rd}$ coating protocols, respectively. Excellent coverage ratio was observed for each coating protocol, though the pda layer obtained using the $1^{st}$ protocol (FIG. 1) was more irregular than the coating obtained via the $2^{nd}$ protocol (FIG. 2). This was expected as the in the $2^{nd}$ protocol, the DA is let the time to be adsorbed on CNT surface through π-π interaction before oxidative polymerization is triggered. FIG. 3 shows the pda-Cu coated CNT obtained with the $3^{rd}$ protocol. The thicknesses of the pda layers obtained by the $1^{st}$ $2^{nd}$ and $3^{rd}$ coating protocols were measured to be about 4 to 10 nm. That pda coatings with greater thickness are obtained with the $2^{nd}$ and $3^{rd}$ coating protocols may be explained by the formation of a DA pre-layer, which then polymerizes.

Example 3bis ("Quick" Coating Protocol)

40 mg of oxidized CNT were added to 50 ml of DA $CuSO_4$ solution (cf. $3^{rd}$ protocol). The dispersion was periodically ultra-sonicated during 10 minutes. DA $CuSO_4$ solution was added to reach 100 ml. The dispersion was again periodically ultra-sonicated during 10 minutes. Small volumes of DA $CuSO_4$ solution were added to reach 250 ml of dispersion while periodically ultra-sonicating the dispersion. 150 ml of Tris-HCl solution (10 mM in water) was then added and the dispersion was once more periodically ultra-sonicated during 5 minutes. The pH was adjusted to a value ranging from 11 to 12 and the coated CNT were filtrated.

CNT Layer Production

CNT layers are preferably obtained by spraying a dispersion of coated CNT on a substrate. In case the metal matrix is to be produced by electrodeposition, the substrate is preferably the working electrode of the electrodeposition step. The substrate could also be a temporary substrate, from which the layer is removed after formation.

The pda-coated CNT are preferably dispersed in a mixture of water and one or more alcohols. The concentration of pda-coated CNT in the dispersion preferably amounts to between 0.1 mg/ml and 5 mg/ml, more preferably to between 0.2 mg/ml and 1.5 mg/ml, e.g. 0.5 mg/ml or 1 mg/ml.

Dispersion of pda-coated CNT in isopropyl alcohol (IPA) only is possible but may lead to CNT aggregate formation in the sprayed layer. This may be undesirable for certain applications. Experiments have shown that the pda-coated CNT can be well dispersed in water. The dispersions in water were stable for days. This may be explained by the high affinity of pda for highly polar solvents. When pda-coated CNT are dispersed in mixtures of water, ethanol and IPA, with relative polarities of 1, 0.654 and 0.546 (see Christian Reichardt, "Solvents and Solvent Effects in Organic Chemistry," Wiley-VCH Publishers, 3rd ed., 2003), sedimentation became visible after several hours. While water allows improving the dispersion, it consequently reduces the evaporation rate of the sprayed film. This may lead to flowing problems on the substrate during spraying and thus to a decrease of layer homogeneity. This effect may be counterbalanced by a proportion of alcohol in the dispersion medium. Although water and alcohol could be used in any proportion, a compromise between evaporation rate and dispersion stability was found with a mixture of 50%/50% (by volume) of water and ethanol. With this mixture, an increased wettability of the substrate was observed, whereby the flowing of the dispersion was reduced. Furthermore, with increasing number of sprays, the sprayed solution tended to form a continuous film on the substrate surface without any flowing leading to improved layer homogeneity with increasing CNT layer thickness.

Spraying tests also indicated that the CNT coating protocol may have an impact on aggregate formation and thus on the homogeneity of the CNT layer. For instance, it was observed that the number of aggregates could be reduced when producing the pda-coated CNT according to the $2^{nd}$ coating protocol and starting with still wet oxidized CNT rather than with dry oxidized CNT. This may be explained by the fact that when oxidized CNT are used directly (without drying), the first ultra-sonication is performed in 50 ml instead of 606 ml of DA solution.

Furthermore, ultra-sonication in smaller volumes allows breaking more CNT aggregates before launching pda polymerization, with the result that more CNT can be coated individually. CNT aggregates that are not broken prior to pda polymerization, can be irreversibly encapsulated in pda. To obtain as many as possible individually pda-coated CNT, it is therefore recommended to maintain the CNT well dispersed (e.g. by repeated ultra-sonication) when Tris-HCl is added, until a stable dispersion is observed.

To produce a CNT layer, the dispersion of pda-coated CNT is sprayed on a substrate, which may be heated to a temperature ranging from room temperature (about 20° C.) to (about) 150° C. in order to make the dispersion medium evaporate faster. The spraying is repeated when the dispersion medium is fully evaporated. The thickness of the CNT layer is controlled by the number of spraying steps. In the following examples, a Paasche VL series airbrush was used to apply the sprays. The substrates has a square surface of 3.5 cm×3.5 cm and the sprays were applied from a distance of about 10-20 cm at pressures between 1.4 and 3.8 bar.

Example 4 (Spraying)

Figure 4:
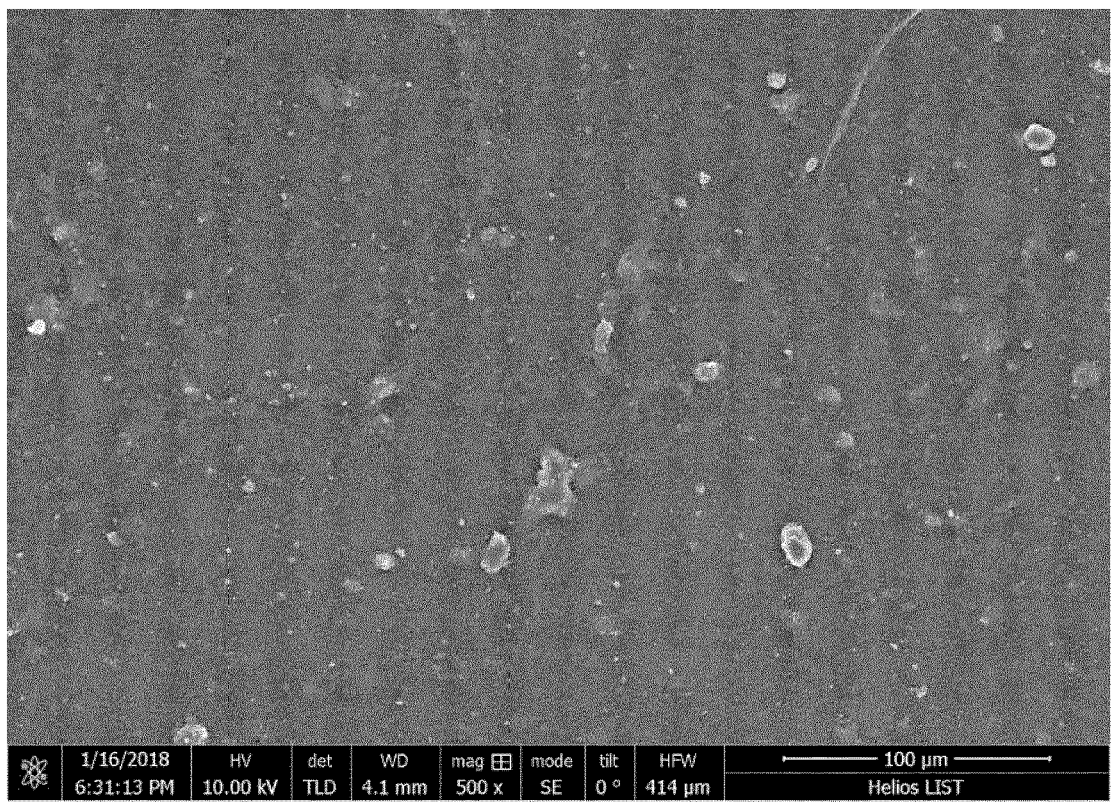
FIG. 4: is a SEM image of a layer of pda-coated CNT obtained by spraying dispersion of pda-coated CNT produced by the $2^{nd}$ coating protocol in an ethanol/water mixture on a substrate.

Pda-coated CNT obtained according to the $2^{nd}$ coating protocol were dispersed in a 50%/50% (by volume) mixture of water and ethanol so as to arrive at a CNT concentration of 0.5 mg/ml. The dispersion was sprayed on a copper substrate (copper foil of 50 μm thickness) heated at 70° C. The number of spray layers was 50. FIG. 4 shows a SEM (scanning electron microscopy) image of a layer of pda-coated CNT in accordance with example 4.

Example 5 (Spraying)

A layer of Pda-coated CNT was obtained as in example 4, except that an ethanol/water mixture of 25%/75% (by volume) was used and the number of spraying steps was increased to 136.

Example 6 (Spraying)

Pda-coated CNT obtained according to the $2^{nd}$ coating protocol were dispersed in a 50%/50% (by volume) mixture of water and ethanol so as to arrive at a CNT concentration of 0.5 mg/ml. The dispersion was sprayed on a glass substrate heated at 70° C. The number of sprayed layers was 50.

Example 7 (Spraying)

Figure 5:
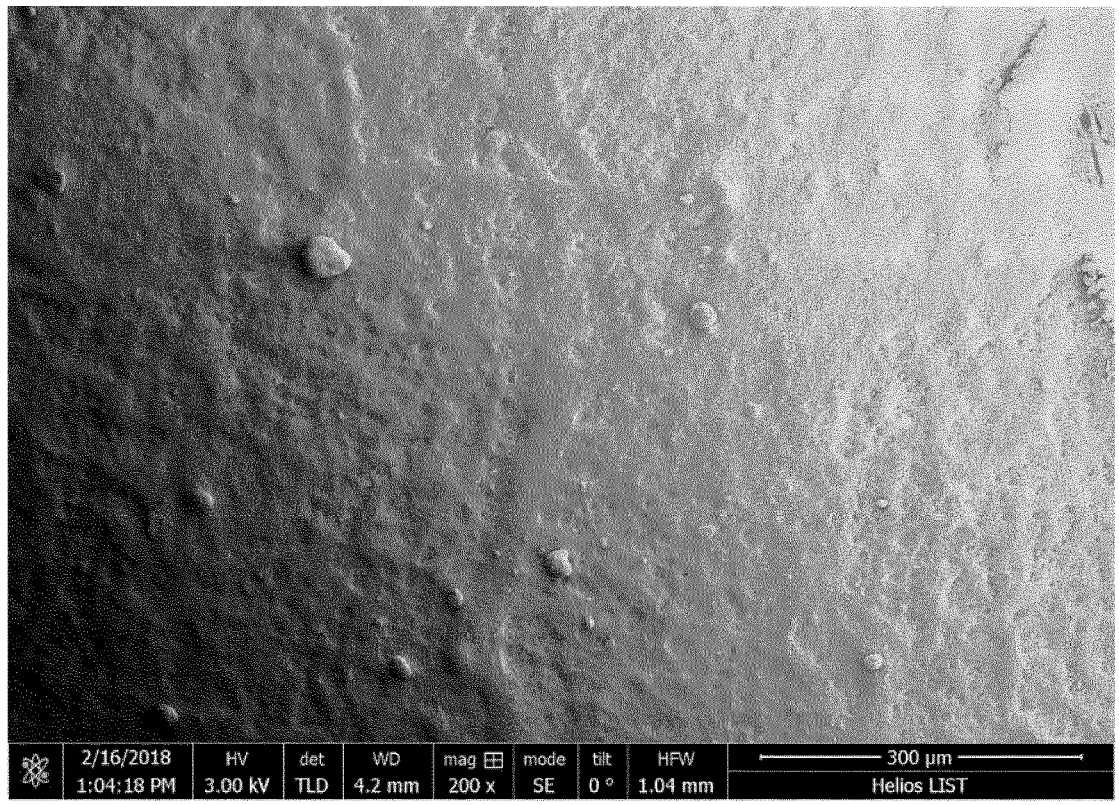
FIG. 5: is a SEM image of a layer of metal-seeded pda-coated CNT obtained by spraying dispersion of pda-coated CNT produced by the $3^{rd}$ coating protocol in an ethanol/water mixture on a substrate.

Pda-coated CNT obtained according to the $3^{rd}$ coating protocol (with Cu loading) were dispersed in a 50%/50% (by volume) mixture of water and ethanol so as to arrive at a CNT concentration of 0.5 mg/ml. The dispersion was sprayed on a copper substrate (copper foil of 50 μm thickness) heated at 85° C. The number of sprayed layers was 50. A Cu-seeded pda-coated CNT layer according to this example is shown in FIG. 5.

When the layer of entangled coated CNT has been formed, the voids in-between the CNT are filled with metal by deposition from an aqueous solution containing the metal ions. In the following, electroplating and electroless deposition will be described in more detail.

Figure 18:
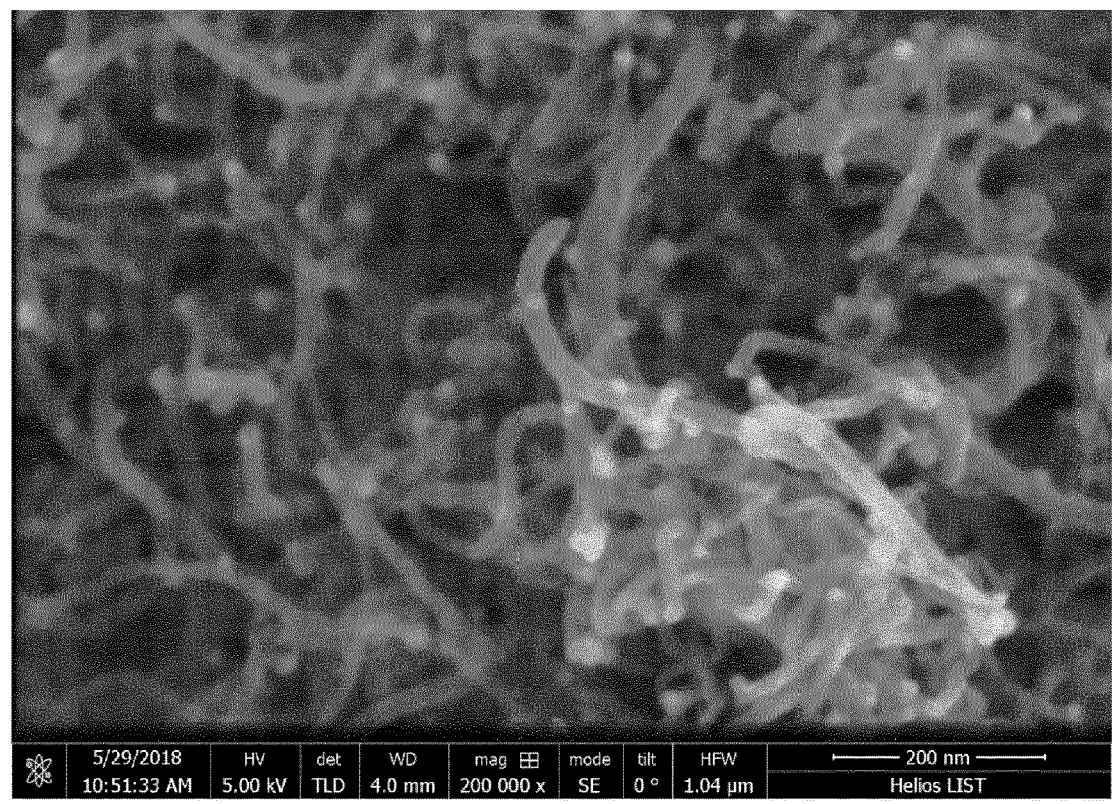
FIG. 18: is a SEM image of a copper-seeded pda-coated CNT after annealing in a reductive environment.

With a Cu-seeded pda-coated CNT layer of the desired thickness, it is possible to carry out an intermediate annealing step in a reductive atmosphere. A reductive environment could e.g. by created using rapid thermal chemical vapor deposition (RTCVD) with the following parameters: 300-400° C., gas: $H_2$/Ar (40 sccm/800 sccm), duration: 2 h. In such an annealing step, $Cu^{2+}$ ions are reduced and form small clusters of metallic Cu (FIG. 18). These metallic particles then serve as seeds for any following electroplating and/or electroless deposition.

Filling With Metal—Electroplating

To fill the CNT layer with metal by electroplating, it may be advantageous to use a metal substrate for the formation of the CNT layer. The metal substrate can then be used as the working electrode in the electrodeposition. Unless otherwise specified in the examples, a Pt electrode was used as the counter electrode.

To provide copper-CNT composites, pda-coated CNT layer may be sprayed on a copper foil of desired thickness. The number of spraying steps determines the thickness of the CNT layer. The copper foil covered with the CNT layer may then be impregnated in a $CuSO_4$ solution in order to pre-charge the pda with copper ions. Tests were carried out with a 0.1 M aqueous $CuSO_4$ solution with impregnation taking place during 30 min but longer impregnation times may be recommended to improve the Cu filling. A Pt counter electrode and a standard hydrogen reference electrode were used. The pH of the plating solution was adjusted to 1 with $H_2SO_4$. The plating was made by chronoamperometry at −0.4 V or −0.2 V (vs SCE) during various times (240, 1440, 8640 s) and/or by pulsed potential (−0.2 V-0.01 s, OFF-0.01 s) during 14400 s.

Example 8 (Electroplating)

Figure 6:
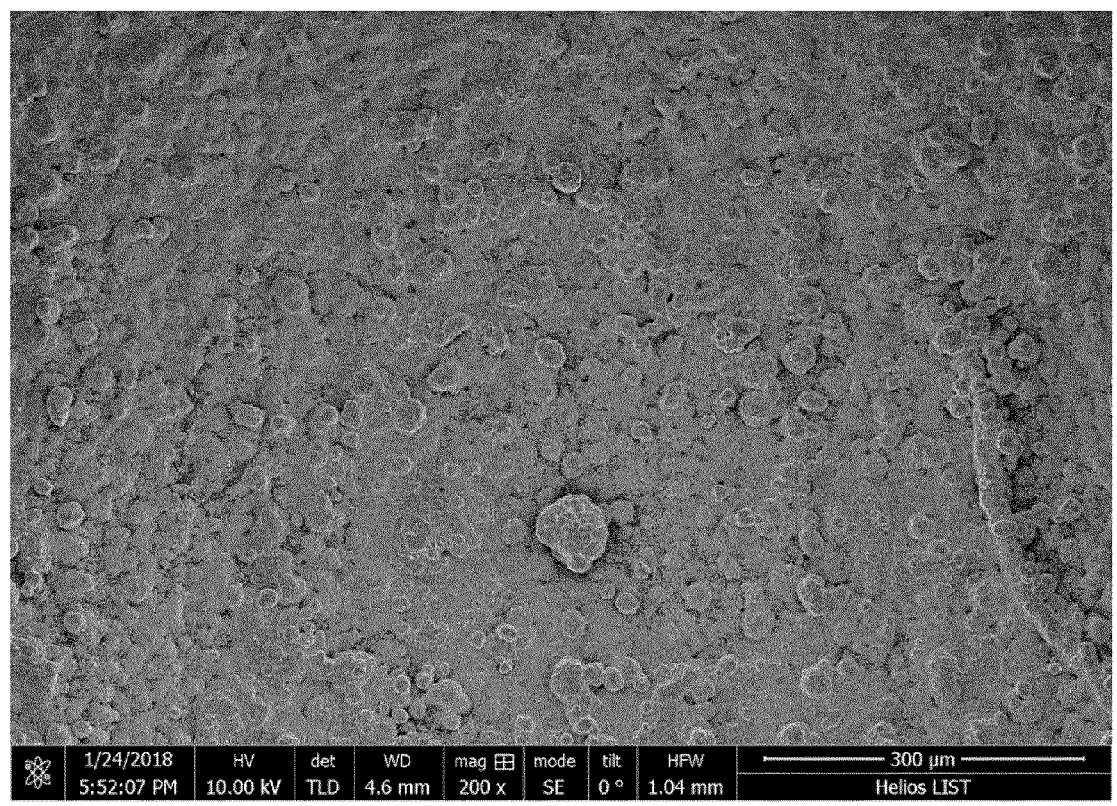
FIG. 6: is a SEM image of the surface of a Cu-CNT composite obtained by chronoamperometry (1440 s, −0.4 V vs saturated calomel electrode (SCE))
Figure 7:
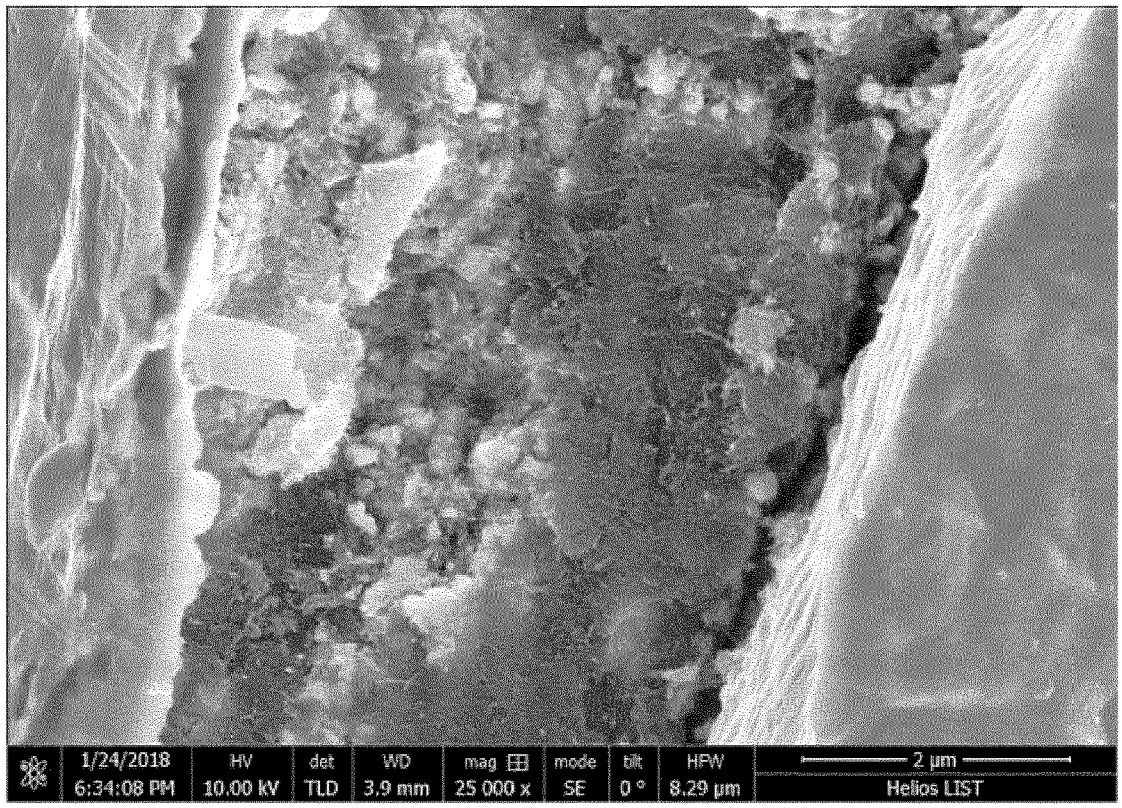
FIG. 7: is a SEM image of a cross section of the Cu-CNT composite of FIG. 6.

The pda-coated CNT layer of example 5 was impregnated in 0.1 M $CuSO_4$ solution during 30 minutes. Chronoamperometries at −0.4 V and −0.2 V (vs SCE) and with various times (240 and 1440 s) were carried out. The filling of the CNT layer was observed to be slightly better when the potential was reduced from −0.4 V (about 14 mA/cm²) to −0.2 V (about 5 mA/cm²). As shown in FIG. 6, the surface was almost totally covered with copper after 1440 seconds (at −0.4 V vs SCE). FIG. 7 shows the obtained composite in cross section. Copper nuclei were seen in and on the CNT layer as well as close to the copper substrate which proved good penetration of plating solution into the CNT matrix and the ability of copper to nucleate on pda-coated CNT. The filling of the CNT layer by copper was, however, incomplete, which may be explained by insufficient charging of the CNT layer with copper during the impregnation step.

Example 9 (Electroplating)

Figure 8:
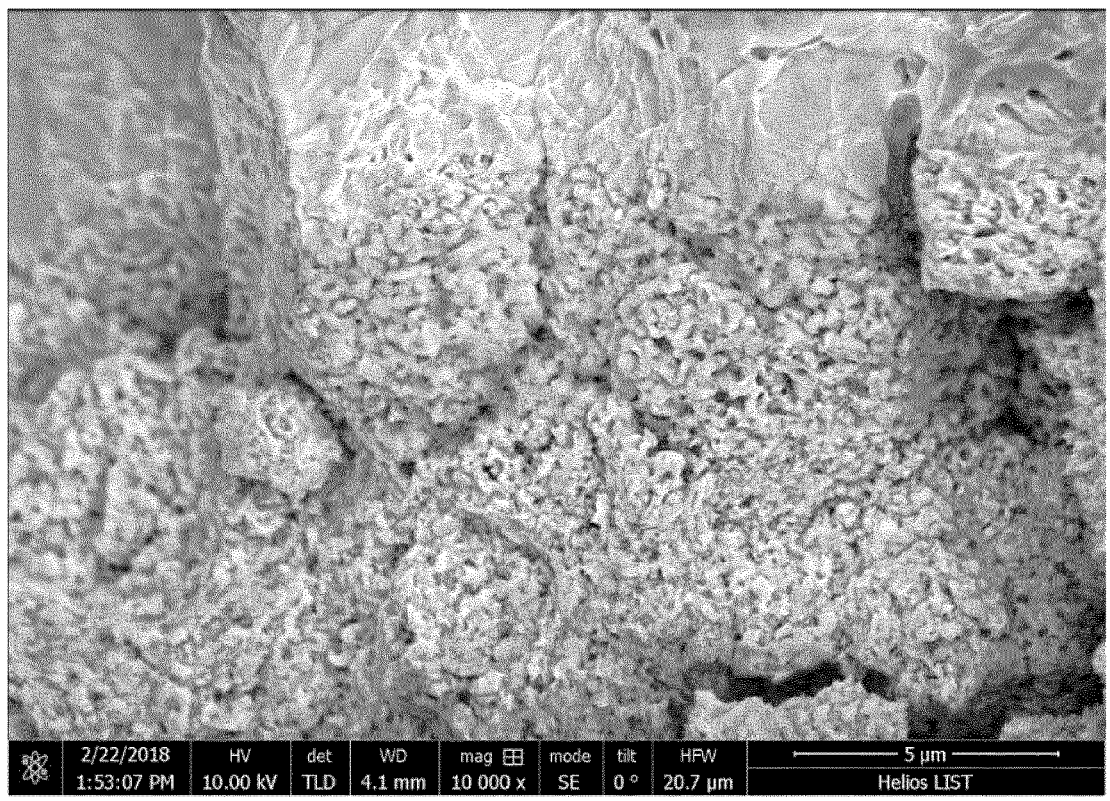
FIG. 8: is a SEM image of a cross section of a Cu-CNT composite obtained by electroplating, using a chronoamperometry process, copper-seeded pda-coated CNT produced by the $3^{rd}$ coating protocol.

The pda-coated CNT containing $Cu^{2+}$ ions obtained by the $3^{rd}$ protocol were sprayed on a copper foil as in example 7. The CNT layer was then impregnated in 0.1 M aqueous $CuSO_4$ solution. A chronoamperometry at −0.2 V (about 5 mA/cm$^2$) during 8640 s was necessary to cover the sample almost completely. This large increase of the time it took to see copper deposit appear on top of the CNT layer (in comparison with example 8) was a first indication of a higher filling of the CNT layer with copper. This was confirmed by SEM: as can be seen in FIG. 8, the copper matrix almost completely fills the CNT layer. This example demonstrates that copper-seeded pda coating may be very useful for the production of highly filled CNT layers.

Example 10 (Electroplating)

Figure 9:
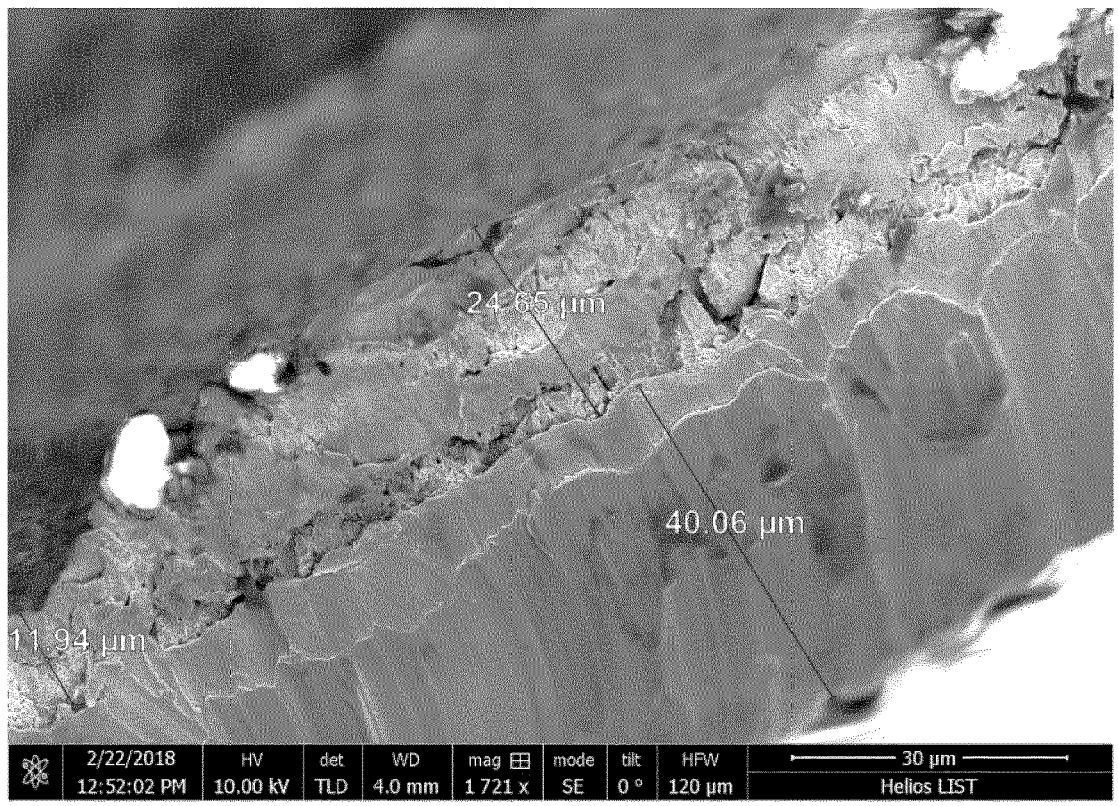
FIG. 9: is a SEM image of a cross section of a Cu-CNT composite obtained by electroplating, using a pulsed-potential process, copper-seeded pda-coated CNT produced by the $3^{rd}$ coating protocol.
Figure 10:
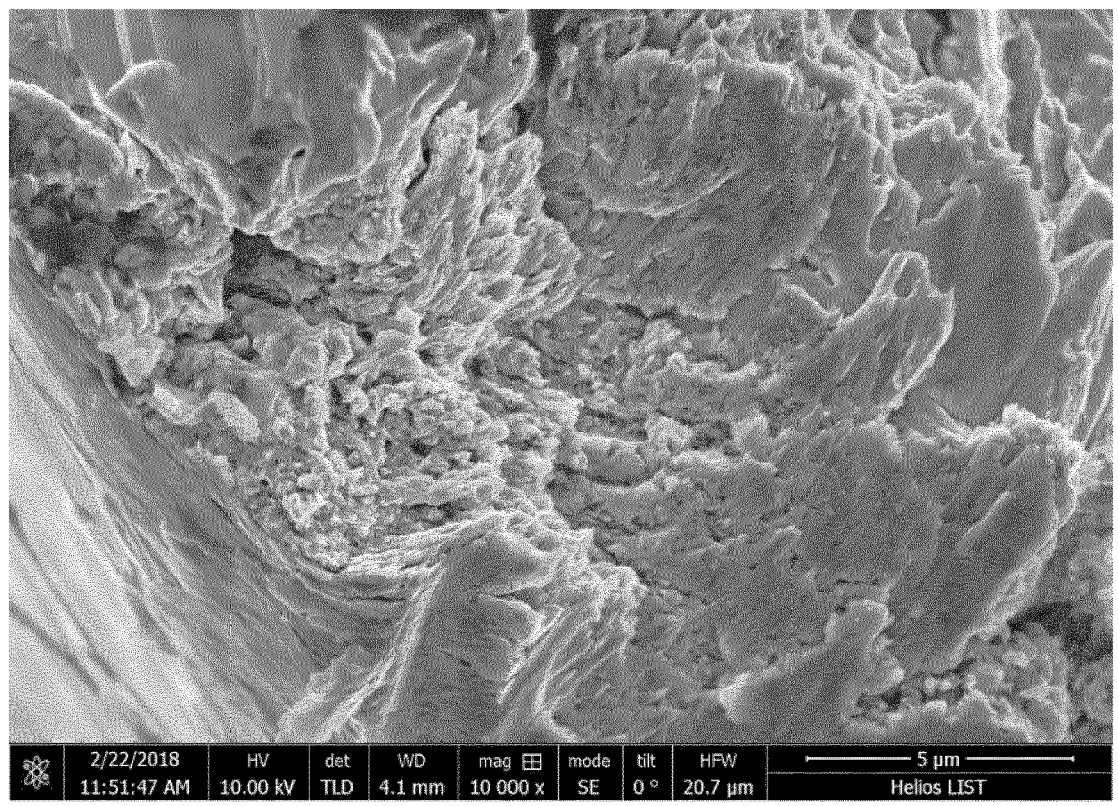
FIG. 10: is a detail view of the Cu-CNT composite of FIG. 9.

The pda-coated CNT containing $Cu^{2+}$ ions obtained by the $3^{rd}$ protocol were sprayed on a copper foil as in example 7. The CNT layer was then impregnated in 0.1 M $CuSO_4$ solution. The sample was subjected to electroplating using a pulsed potential (−0.2 V-0.01 s, OFF-0.01 s, vs SCE) during 14400 s in order to improve diffusion of copper ions into the voids of the CNT layer as well as to smoothen the composite surface with respect to the surface that was observed in example 8 (FIG. 8). The plating was stopped after 14440 s (corresponding to 7220 s ON time at −0.2 V vs SCE). As shown in FIG. 9, the resulting Cu-CNT composite layer was smooth and exempt from cracks. SEM analysis revealed that the CNT were perfectly embedded in a copper matrix (FIG. 10).

To illustrate the performance of Cu-CNT composite material, an ampacity test was carried out. For comparison, wires made of standard copper foil (the same as the one that was used as the substrate in electroplating) were tested as well. The copper test lines had widths of about 450-480 μm and were made by stamping with two clamped razors blades. A first set of Cu test lines were exposed to air, whereas a second set was clamped between two alumina plates for better evacuation of heat. The Cu-CNT composite test lines were obtained as in examples 9 and 10 and had widths of about 480 μm. The Cu-CNT composite test lines remained exposed to air (i.e. they were not clamped between alumina plates). In all tests, a Princeton Applied Research VersaSTAT MC potentiostat coupled to a Kepco BOP 20-20M amplifier was used to generate a voltage ramp (0.02 V/s), while the current was measured until breaking of the line.

Figure 11:
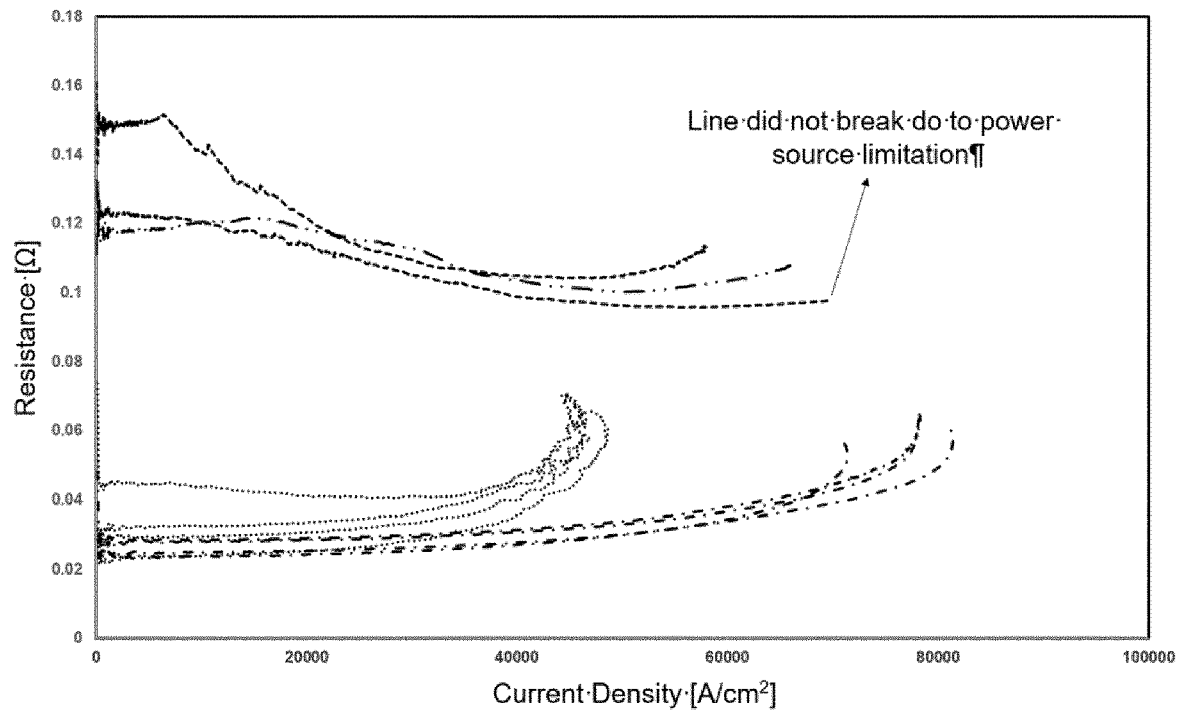
FIG. 11: is a diagram representing ampacity measurements made on Cu-CNT composite wires (top curves: " –··–··–··– " and " ------ ") and, for comparison, on naked copper wires (bottom curves: " ········ ") as well as on copper wires clamped between alumina plates (bottom curves: " –·–·–·– ")

FIG. 11 illustrates the measured resistance versus the current density. It should be noted that the leads used to connect the different samples to the power source were not identical and, therefore, the resistance offsets between the different samples should be disregarded. The presence of the Cu-CNT composite layer (made as in examples 9 and 10) increased the ampacity values with respect to the naked copper foil. Furthermore, one observes a decrease of the resistance in the first stages of the ampacity measurement. This behaviour is coherent with was observed by Subramaniam et al. and is likely to be due to an improvement of the Cu-CNT interface and to thermally activated carriers when the Cu-CNT interface is stressed by the current.

Example 11 (Electroplating)

Figure 12:
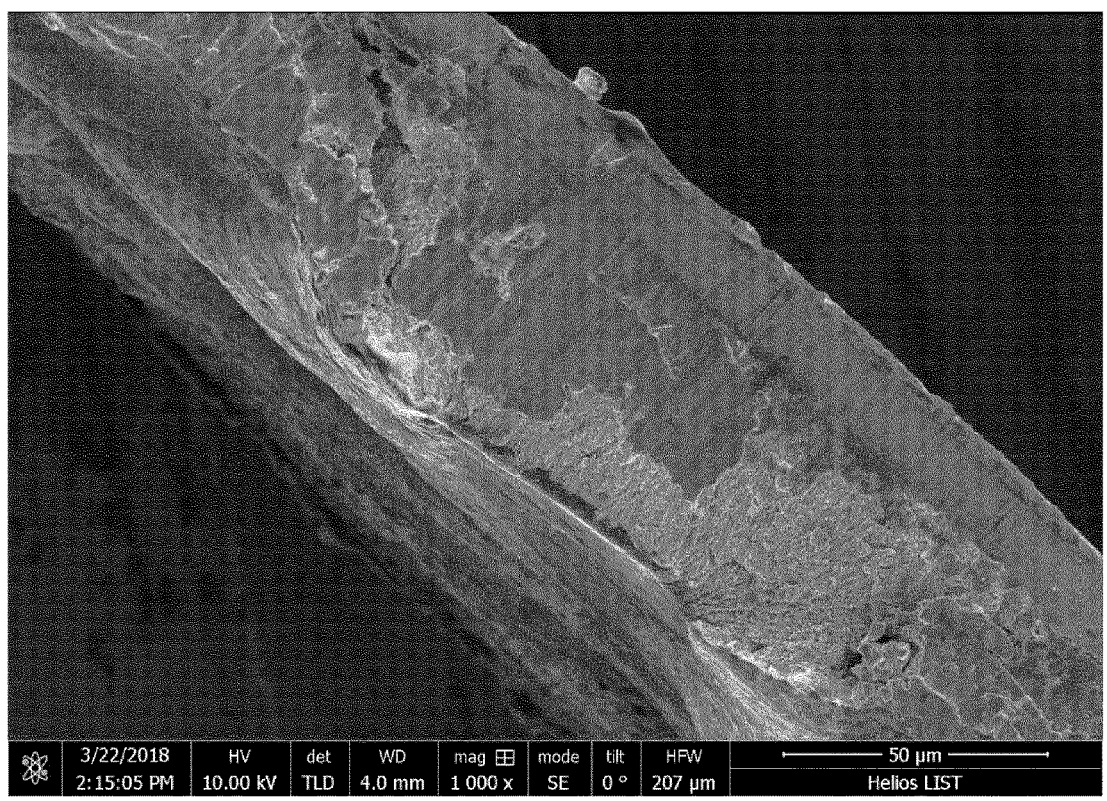
FIG. 12: is a SEM image of a cross section of a 50 μm thick Cu-CNT composite obtained by electroplating, using a pulsed-potential process, copper-seeded pda-coated CNT produced by the $3^{rd}$ coating protocol.

The pda-coated CNT containing $Cu^{2+}$ ions obtained by the $3^{rd}$ protocol were sprayed on a copper foil as in example 7, except that the copper substrate was only 6 μm thick, was heated to 150° C. and spraying was repeated until a thickness of 45-50 μm was reached. No impregnation was carried out but the sample was subjected to electroplating from aqueous 0.1 M $CuSO_4$ solution (pH adjusted to 1 by addition of $H_2SO_4$) using a pulsed potential (−0.2 V—0.01 s, OFF—0.01 s, vs SCE) during 16 h, at room temperature, under stirring. The resulting Cu-CNT composite (FIG. 12) had a thickness of 50 μm.

Example 12 (Electroplating)

Figure 17:
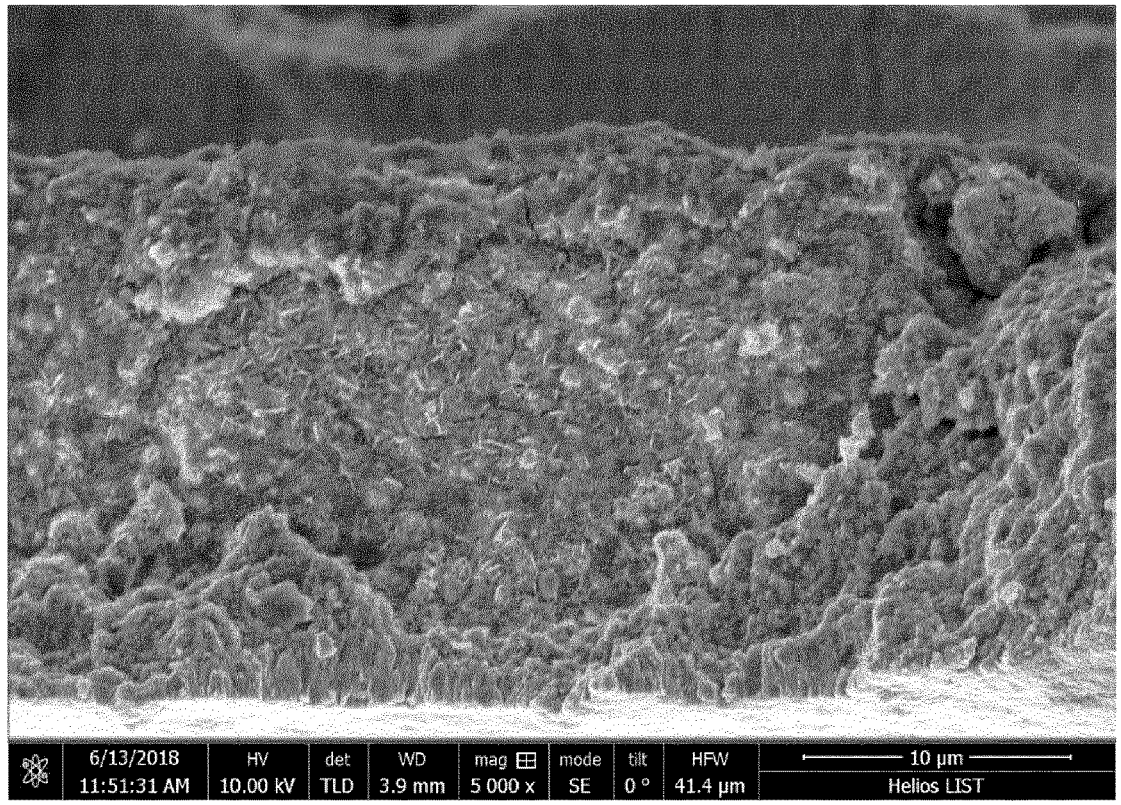
FIG. 17: is a SEM image of a cross section of a Fe-CNT composite.

The pda-coated CNT containing $Cu^{2+}$ ions obtained by the $3^{rd}$ protocol were sprayed on a copper foil as in example 7, except that the copper substrate was only 6 μm thick, was heated to 150° C. and spraying was repeated until a thickness of 45-50 μm was reached. No impregnation was carried out but the sample was subjected to electroplating from aqueous 0.1 M $FeSO_4$ solution (pH adjusted to 3.2 by addition of $H_2SO_4$) using an applied potential of −1.1 V (vs SCE) at 40° C., under stirring. The resulting Fe-CNT composite is shown in FIG. 17.

It is worthwhile noting that the degree of filling with metal may be controlled by the duration of the electroplating. The thickness of the layer of coated CNT needs of course to be taken into account.

Filling With Metal—Electroless Deposition

Example 13 (Electroless Deposition)

Figure 13:
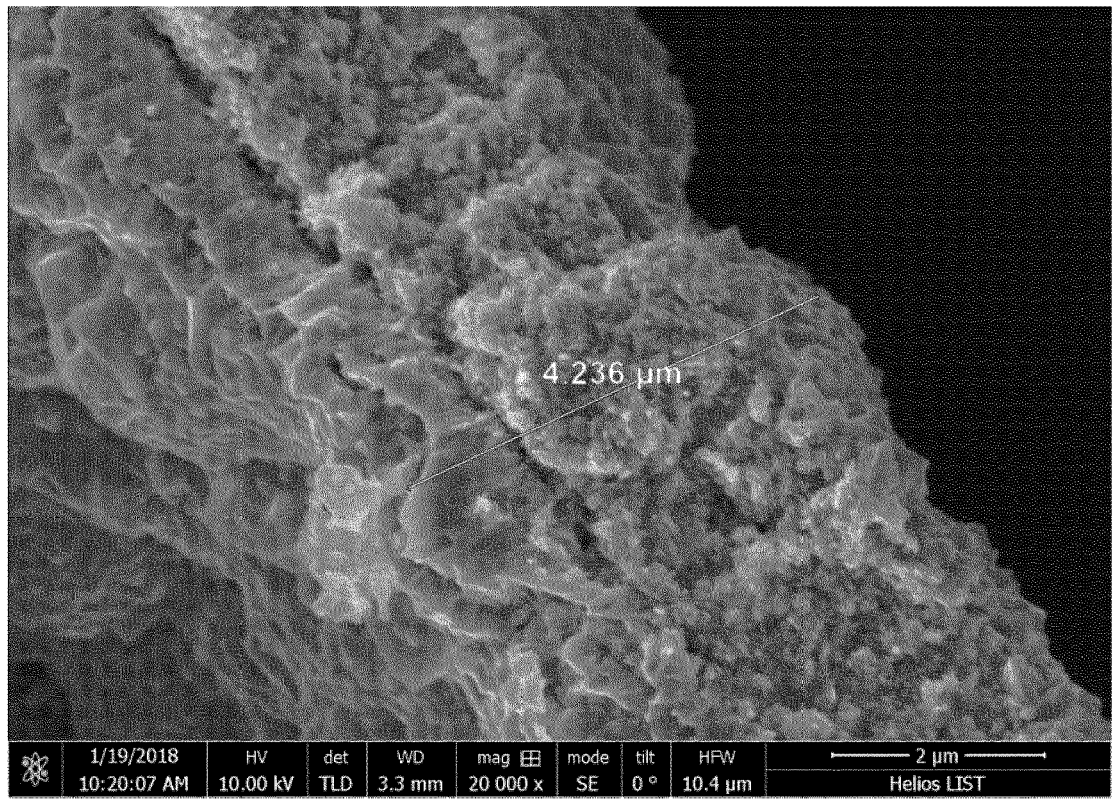
FIG. 13: is a cross-sectional SEM image of a Cu-CNT composite obtained by electroless copper deposition.

The pda-coated CNT layer of example 6 was used to test electroless deposition. The sample was immersed in an electroless deposition solution during the desired time. The electroless solution contained glyoxilic acid (0.2 M) as reducing agent, EDTA (Ethylenediaminetetraacetic acid, 0.03 M) and $CuSO_4$ (0.03 M). The solution was heated to between 50 and 60° C. and the pH was adjusted to 12-12.5 using NaOH. The immersion of the sample in the electroless solution led to delamination of the CNT layer from the glass substrate, probably due to $H_2$ bubbles trapped between the CNT layer and the substrate. Although relatively fragile, the CNT layer conserved its cohesion and kept floating in the solution. When the CNT layer was progressively filled by copper, it turned became a more and more stable Cu-CNT composite (FIG. 13). This fabrication path is interesting as it allows fabricating self-supported Cu-CNT composites.

It may be worthwhile noting that delamination is not a necessary process step but it may be used to produce very thin CNT tissues. The ampacity of the composite of example 13 was slightly increased compared to copper foil in same conditions (about 8·10$^4$ A/cm$^2$). Although this was not tested, it is expected that using CNT coated with pda containing copper seeds would improve the copper filling with the electroless deposition technique.

Metal-CNT Composites Using CNT With Tannic Acid Coating

Example 14 (CNT Coating With Tannic Acid)

125 ml of tannic acid (0.01 mg/ml)+$CuSO_4·5H_2O$ (0.6 mg/ml) were prepared in water. 20 mg of oxidized CNT were added to 50 ml of this solution. The dispersion was periodically ultra-sonicated while adding tannic acid $CuSO_4$ solution until a volume of 125 ml was reached. The dispersion was then periodically ultra-sonicated during 20 minutes. 75 ml of Tris-HCl solution (10 mM) was added and periodical ultra-sonications were carried out during 30 minutes. The pH was adjusted to a value ranging from 11 to 12 and the coated CNT were filtrated.

Example 15 (Spraying)

Figure 14:
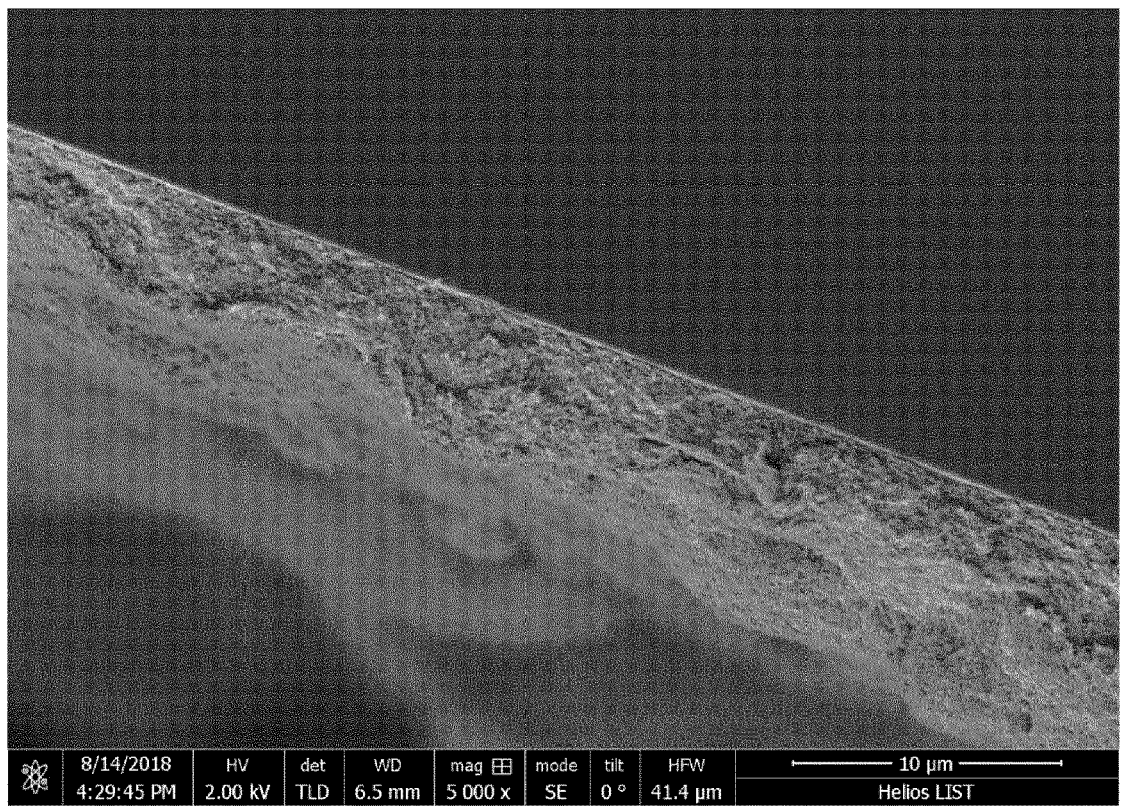
FIG. 14: is a cross-sectional SEM image of a layer of copper-seeded, tannic-acid-coated CNT.

The metal-ion-seeded coated CNT of example 14 were dispersed in 40 ml ethanol/water mixture (50%/50% by volume) so as to arrive at a concentration of 0.5 mg/ml. The dispersion was then sprayed in several layers on a on a Si—TaN (10 nm)-Ta (15 nm)-Cu (150 nm) substrate using the Paasche VL series airbrush (distance from the substrate about 15 cm. The substrate temperature was 90° C. The resulting sprayed layer (FIG. 14) had a thickness of about 3.5 μm.

Example 16 (Electroplating)

Figure 15:
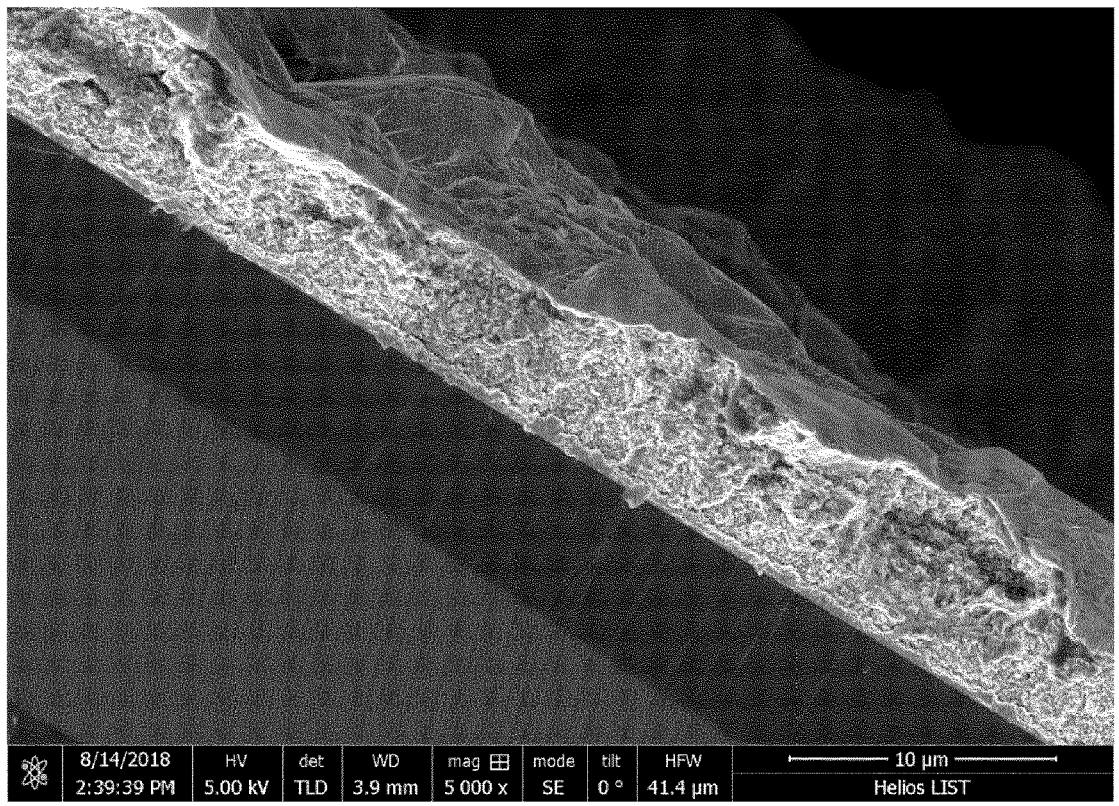
FIG. 15: is a SEM image of a cross section of a Cu-CNT composite obtained by electroplating the tannic-acid-coated CNT of FIG. 14.
Figure 16:
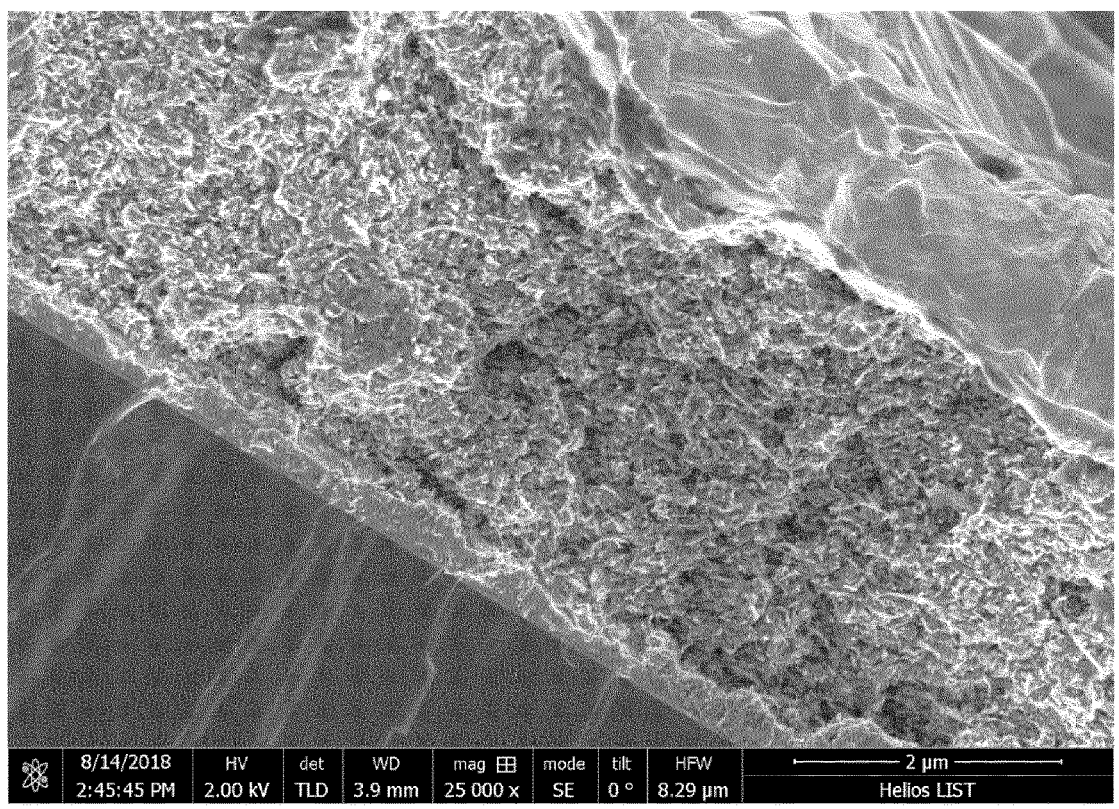
FIG. 16: is another SEM image of a cross section of the Cu-CNT composite obtained by electroplating the tannic-acid-coated CNT of FIG. 14

The CNT layer of example 15 was subjected to electroplating in an aqueous 0.1 M $CuSO_4$ solution (at room temperature). The pH was adjusted to 1 by addition of $H_2SO_4$. During the electroplating (potential: −0.2 V vs SCE, duration: 30 minutes) the solution was stirred. The resulting composite (FIGS. 15 and 16) had a thickness of about 5 μm.

While specific embodiments have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A composite conductive material comprising:
   a layer of carbon nanotubes,
   a metal matrix filling the interstices of the carbon nanotubes layer;
   wherein the carbon nanotubes comprise a graphitised or amorphous carbon coating at the interfaces with the metal matrix.

2. A method for producing a composite material, comprising:
   providing a layer of carbon nanotubes by depositing, on a substrate, carbon nanotubes coated with a polyphenol coating, the polyphenol coating being a tannic acid-metal complex crosslinked by metal ions,
   filling interstices of the carbon nanotubes layer with a metal so as to form a metal matrix, in which the carbon nanotubes are embedded, said filling being effected by electrodeposition or by electroless deposition;
   wherein said metal ions promote, as metal seeds, at least one of adhesion and growth of the metal matrix during the filling step.

3. The method as claimed in claim 2, wherein the coated carbon nanotubes are provided within a suspension and wherein depositing the carbon nanotubes comprises spraying the suspension on the substrate and causing the dispersion medium to evaporate, the spraying being repeated until a desired thickness of the carbon nanotubes layer is reached.

4. The method as claimed in claim 2, wherein the metal matrix consists of a metal selected from: Cu, Ag, Au, Sn, Zn, Cd, Cr, Ni, Pt, Pb, Pd, Co, Ti, Fe, and an alloy thereof.

5. The method as claimed in claim 3, wherein the filling of the interstices of the carbon nanotubes layer is effected by electroless deposition from an aqueous solution comprising metal ions.

6. The method as claimed in claim 5, wherein the layer of carbon nanotubes is removed from the substrate on which it has been deposited prior to or during electroless deposition.

7. The method as claimed in claim 2, wherein the composite material is produced as one or more electrical conductors on a substrate by using a patterning technique.

8. A method for producing a composite material, comprising:
   providing a layer of carbon nanotubes by depositing, on a substrate, carbon nanotubes coated with a polyphenol coating, the polyphenol coating being crosslinked by metal ions,
   filling interstices of the carbon nanotubes layer with a metal so as to form a metal matrix, in which the carbon nanotubes are embedded, said filling being effected by electrodeposition from an aqueous solution comprising metal ions;
   wherein said metal ions promote, as metal seeds, at least one of adhesion and growth of the metal matrix during the filling step.

9. The method as claimed in claim 8, wherein the coated carbon nanotubes are provided within a suspension and wherein depositing the carbon nanotubes comprises spraying the suspension on the substrate and causing the dispersion medium to evaporate, the spraying being repeated until a desired thickness of the carbon nanotubes layer is reached.

10. The method as claimed in claim 8, wherein the metal matrix consists of a metal selected from: Cu, Ag, Au, Sn, Zn, Cd, Cr, Ni, Pt, Pb, Pd, Co, Ti, Fe, and an alloy thereof.

11. The method as claimed in claim 8, wherein the carbon nanotubes are coated with a polydopamine coating or with a tannic acid-metal complex.

12. The method as claimed in claim 8, comprising coating the carbon nanotubes with the polyphenol coating, the coating being carried out in a solution containing at least one of phenol and catecholamine moieties wherein initially uncoated carbon nanotubes are dispersed, the solution further containing metal ions capable of crosslinking the at least one of phenol and catecholamine moieties.

13. The method as claimed in claim 12, wherein the carbon nanotubes are oxidized prior to dispersion in the solution containing that at least one of phenol and catecholamine moieties.

14. The method as claimed in claim 8, wherein the composite material is produced as one or more electrical conductors on a substrate by using a patterning technique.

15. A method for producing a composite material, comprising:
   providing a layer of carbon nanotubes by depositing, on a substrate, carbon nanotubes coated with a polyphenol coating, the polyphenol coating being crosslinked by metal ions,
   filling interstices of the carbon nanotubes layer with a metal so as to form a metal matrix, in which the carbon nanotubes are embedded, said filling being effected by electrodeposition or by electroless deposition;
   wherein said metal ions promote, as metal seeds, at least one of adhesion and growth of the metal matrix during the filling step,
   wherein deposition of the metal matrix is continued when the filling of the interstices is complete, so as to form a metal capping layer on the composite material.

16. The method as claimed in claim 15, wherein the coated carbon nanotubes are provided within a suspension and wherein depositing the carbon nanotubes comprises spraying the suspension on the substrate and causing the dispersion medium to evaporate, the spraying being repeated until a desired thickness of the carbon nanotubes layer is reached.

17. The method as claimed in claim 15, wherein the metal matrix consists of a metal selected from: Cu, Ag, Au, Sn, Zn, Cd, Cr, Ni, Pt, Pb, Pd, Co, Ti, Fe, and an alloy thereof.

18. The method as claimed in claim 15, wherein the carbon nanotubes are coated with a polydopamine coating or with a tannic acid-metal complex.

19. The method as claimed in claim 15, wherein said filling is effected by electroless deposition and wherein the layer of carbon nanotubes is removed from the substrate on which it has been deposited prior to or during electroless deposition.

20. The method as claimed in claim 15, comprising coating the carbon nanotubes with the polyphenol coating, the coating being carried out in a solution containing at least one of phenol and catecholamine moieties wherein initially uncoated carbon nanotubes are dispersed, the solution further containing metal ions capable of crosslinking the at least one of phenol and catecholamine moieties, wherein the carbon nanotubes are oxidized prior to dispersion in the solution containing that at least one of phenol and catecholamine moieties.

21. The method as claimed in claim 15, wherein the composite material is produced as one or more electrical conductors on a substrate by using a patterning technique.

22. A method for producing a composite material, comprising:
   providing a layer of carbon nanotubes by depositing, on a substrate, carbon nanotubes coated with a polyphenol coating, the polyphenol coating being crosslinked by metal ions,
   filling interstices of the carbon nanotubes layer with a metal so as to form a metal matrix, in which the carbon nanotubes are embedded, said filling being effected by electrodeposition or by electroless deposition;
   wherein said metal ions promote, as metal seeds, at least one of adhesion and growth of the metal matrix during the filling step; and
   wherein the composite material is annealed.

23. The method as claimed in claim 22, wherein the coated carbon nanotubes are provided within a suspension and wherein depositing the carbon nanotubes comprises spraying the suspension on the substrate and causing the dispersion medium to evaporate, the spraying being repeated until a desired thickness of the carbon nanotubes layer is reached.

24. The method as claimed in claim 22, wherein the metal matrix consists of a metal selected from: Cu, Ag, Au, Sn, Zn, Cd, Cr, Ni, Pt, Pb, Pd, Co, Ti, Fe, and an alloy thereof.

25. The method as claimed in claim 22, wherein the carbon nanotubes are coated with a polydopamine coating or with a tannic acid-metal complex.

26. The method as claimed in claim 22, wherein said filling is effected by electroless deposition and wherein the layer of carbon nanotubes is removed from the substrate on which it has been deposited prior to or during electroless deposition.

27. The method as claimed in claim 22, wherein deposition of the metal matrix is continued when the filling of the interstices is complete, so as to form a metal capping layer on the composite material.

28. The method as claimed in claim 22, comprising coating the carbon nanotubes with the polyphenol coating, the coating being carried out in a solution containing at least one of phenol and catecholamine moieties wherein initially uncoated carbon nanotubes are dispersed, the solution further containing metal ions capable of crosslinking the at least one of phenol and catecholamine moieties, wherein the carbon nanotubes are oxidized prior to dispersion in the solution containing that at least one of phenol and catecholamine moieties.

29. The method as claimed in claim 22, wherein the composite material is produced as one or more electrical conductors on a substrate by using a patterning technique.

\* \* \* \* \*